Patented Sept. 25, 1928.

1,685,341

UNITED STATES PATENT OFFICE.

WALTER SCHOELLER, ADOLF FELDT, MAX GEHRKE, AND ERICH BORGWARDT, OF BERLIN, GERMANY, ASSIGNORS TO THE FIRM: CHEMISCHE FABRIK AUF ACTIEN (VORM. E. SCHERING), OF BERLIN, GERMANY.

PHARMACEUTICAL PRODUCTS.

No Drawing. Application filed May 9, 1925, Serial No. 29,207, and in Germany June 2, 1924.

Our invention refers to pharmaceutical products and more especially to products obtained from amino metal mercapto benzene compounds; it further refers to the methods of making such products. The new products are distinguished from the amino metal mercapto benzene compounds by a greater stability of the watery solutions of their salts and by a more favorable chemotherapeutical coefficient. We preferably obtain them by causing acylizing agents, such as anhydrides, halides or the like, of acids to act on the compounds mentioned above in the form of their acids or salts.

Provided that an acylizing agent other than phosgen is employed, the new products correspond to the formula

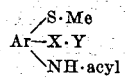

wherein Ar is a benzene nucleus, Me a heavy metal, X=COO or $SO_3$ and Y=either H or a metal, preferably an alkali metal. Acyl may be a saturated or non-saturated acid radical.

The new products are not easily soluble in water as acids, but easily soluble therein as alkali salts. In both forms they are soluble in alcohol only with difficulty. They are distinguished by their action on spirochaetae, more especially on spirochæta pallida and recurrens. In their gold and silver compounds the metal forms part of a complex compound and cannot be traced by means of the usual precipitating agents. The new products are preferably used in the form of their soluble salts, more especially sodium salts, by subcutaneous or intravenous injection.

In producing the new compounds according to the present invention we preferably proceed as follows:

*Example 1.*—28 grams of the 4-amino-2-argento mercapto benzene-1-carboxylic acid (see for instance U. S. Patent 1439624) are suspended in 200 ccms. water and a 10 per cent soda solution is added drop by drop until solution begins and a weak alkaline reaction is obtained. 12 ccms. acetic acid anhydride are now added to the mixture and stirred until the $NH_2$ group can no more be traced. The free acid which is formed is well rinsed and is then dissolved in the exact quantity of soda required for solution, whereupon the sodium salt of 4-acetyl amino-2-argento mercapto benzene-1-carboxylic acid

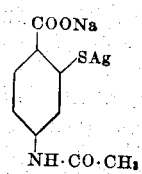

is precipitated with alcohol. After some time another considerable portion is obtained in the form of a micro crystalline powder. The product has a whitish-yellow color and is easily soluble in water. The watery solution shows a neutral reaction.

*Example 2.*—77 grams 4-amino-2-auro mercapto benzene-1-carboxylic sodium are shaken in watery solution with an etheric solution of 25 grams meta-nitro benzoyl chloride. The condensation product thus formed is separated by filtration, rinsed with hot water and thereafter with ether and reduced with ferrous salt in alkaline solution. After removing the iron sludge and acidifying with dilute hydrochloric acid there is obtained the 4-meta-amino benzoyl-amino-2-auro mercapto benzene-1-carboxylic acid, which forms a greenish grey deposit soluble in dilute alkalis.

If other amino metal mercapto benzene compounds or their salts are employed, the process will give analogous results.

We wish it to be understood that we do not desire to be limited to the exact substances, proportions, conditions and sequence of operations above described, for obvious modifications will occur to a person skilled in the art.

In the appended claims the term "acid" is designed to include also the soluble salts of the respective acids.

We claim:—

1. As a new product, the derivative of an amino metal mercapto compound corresponding to the formula

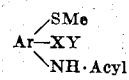

wherein Ar is a benzene nucleus, Me is a heavy metal, X is COO, Y is hydrogen or a metal, more especially an alkali metal, such product dissolving in water only with difficulty as an acid, readily as an alkali salt and having a therapeutical effect more especially in cases caused by spirochaetae.

2. The method of producing new derivatives of amino metal mercapto compounds, consisting in acting on an amino metal mercapto benzene compound with an acylizing agent.

3. The method of producing new derivatives of amino metal mercapto compounds, consisting in acting on 4-amino-2-metal mercapto benzene-1-carboxylic acid with an acylizing agent.

4. The method of producing new derivatives of amino metal mercapto compounds, consisting in acting on 4-amino-2-auro mercapto benzene-1-carboxylic acid with an acylizing agent.

5. The method of producing new derivatives of amino metal mercapto compounds, consisting in acting on an amino mercapto benzene compound first with an acylizing agent and thereafter introducing a metal into the sulfhydryl group.

6. As new products the acetyl-amino metal mercapto benzene carboxylic acids and their salts corresponding to the formula

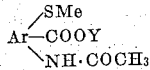

wherein Ar is a benzene nucleus, Me is a heavy metal, Y is hydrogen or an alkali metal, such product dissolving in water only with difficulty as an acid, readily as an alkali salt and having a therapeutical effect more especially in cases caused by spirochaetæ.

7. As new products the acetyl amino auro mercapto benzene carboxylic acids and their salts corresponding to the formula

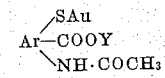

wherein Ar is a benzene nucleus, Y is hydrogen or an alkali metal, such product dissolving in water only with difficulty as an acid, readily as an alkali salt and having a therapeutical effect more especially in cases caused by spirochaetæ.

8. The method of producing new derivatives of amino metal mercapto compounds, comprising acting on an amino metal mercapto benzene carboxylic acid with an acylizing agent.

In testimony whereof we affix our signatures.

WALTER SCHOELLER.
ADOLF FELDT.
MAX GEHRKE.
ERICH BORGWARDT.